(12) United States Patent
Brannon

(10) Patent No.: US 6,343,521 B1
(45) Date of Patent: Feb. 5, 2002

(54) INFINITELY VARIABLE GEAR TRANSMISSION

(76) Inventor: Cecil R. Brannon, 265 Royal Ridge Ct., Foley, MO (US) 63347

(*) Notice: Subject to any disclaimer, the term of this patent is extended or adjusted under 35 U.S.C. 154(b) by 15 days.

(21) Appl. No.: 09/585,256

(22) Filed: Jun. 2, 2000

Related U.S. Application Data

(63) Continuation-in-part of application No. 09/286,313, filed on Apr. 5, 1999, now Pat. No. 6,257,083.

(51) Int. Cl.[7] ................................................. F16H 3/22
(52) U.S. Cl. ....................................................... 74/349
(58) Field of Search ................................... 74/348, 349

(56) References Cited

U.S. PATENT DOCUMENTS 6,257,083 B1 * 7/2001 Brannon ...................... 74/349

* cited by examiner

*Primary Examiner*—Dirk Wright
(74) *Attorney, Agent, or Firm*—Henry W. Cummings

(57) ABSTRACT

An infinitely variable gear transmission system includes a pair of cones, one the driving cone and the other the driven cone, in which each have at their external surfaces a pair of gears which interact to transmit power from the driving gear to the driven gear, and where the means for controlling the speed of the driving gear and the driven the gear includes an accelerator linkage which causes the gears to move longitudinally back and forth relative to the rotating cones.

28 Claims, 9 Drawing Sheets

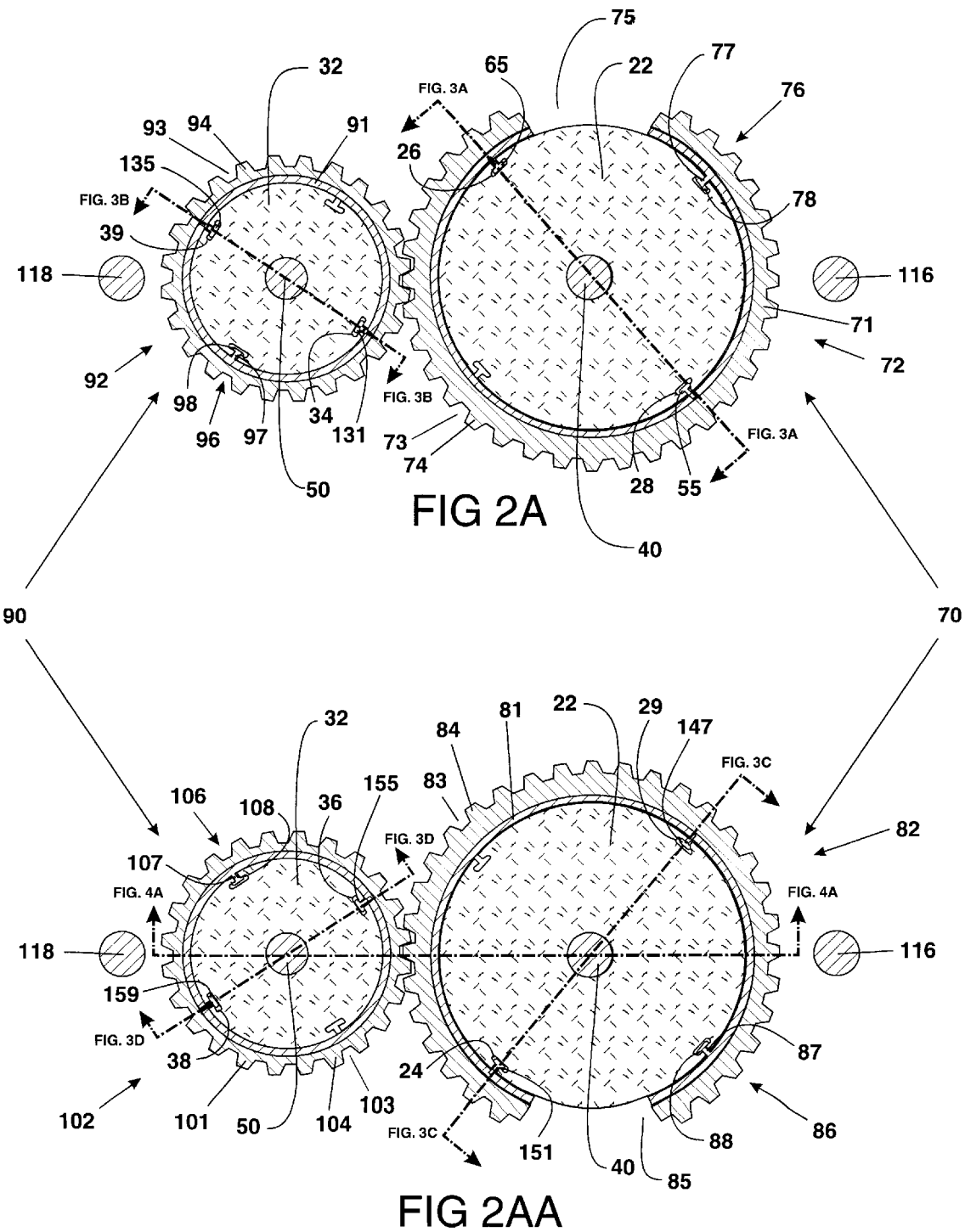

INFINITELY VARIABLE GEAR TRANSMISSION

I REFERENCE TO RELATED APPLICATION

This application is a continuation-in-part of application Ser. No. 09/286,313 filed Apr. 5, 1999 Now U.S. Pat. No. 6,257,083.

II FIELD OF THE INVENTION

This invention relates to an infinitely variable gear transmission system and a method of making and using such a transmission system.

III BACKGROUND OF THE INVENTION

U.S. Pat. Nos. 1,883,355; 3,728,911; 4,038,886; 4,805,488; British Patent 898,033; and German Offenlegungsschrift Patent 26 25 740 (Copies attached in Application file) disclose infinitely variable gear transmissions.

However, none of these references disclose a variable gear transmission system in which a pair of cones, one the driving cone and the other the driven cone, have at their external surfaces, a pair of gears which interact to transmit power from the driving gear to the driven gear, and where the means for controlling the speed of the driving gear and the driven the gear comprises an accelerator linkage which causes the gears to move longitudinally back and forth relative to the rotating cones.

IV SUMMARY OF THE INVENTION

A. Objects

One object of the present invention is to provide an improved infinitely variable gear transmission system.

Another object of the present invention is to provide an improved method of transmitting rotative power.

B. Summary

An infinitely variable gear transmission system includes a pair of cones, one the driving cone and the other the driven cone, in which each have at their external surfaces a pair of gears which interact to transmit power from the driving gear to the driven gear, and where the means for controlling the speed of the driving gear and the driven gear comprises an accelerator linkage which causes the gears to move longitudinally back and forth relative to the rotating cones.

IV THE DRAWINGS

Figure 1A:
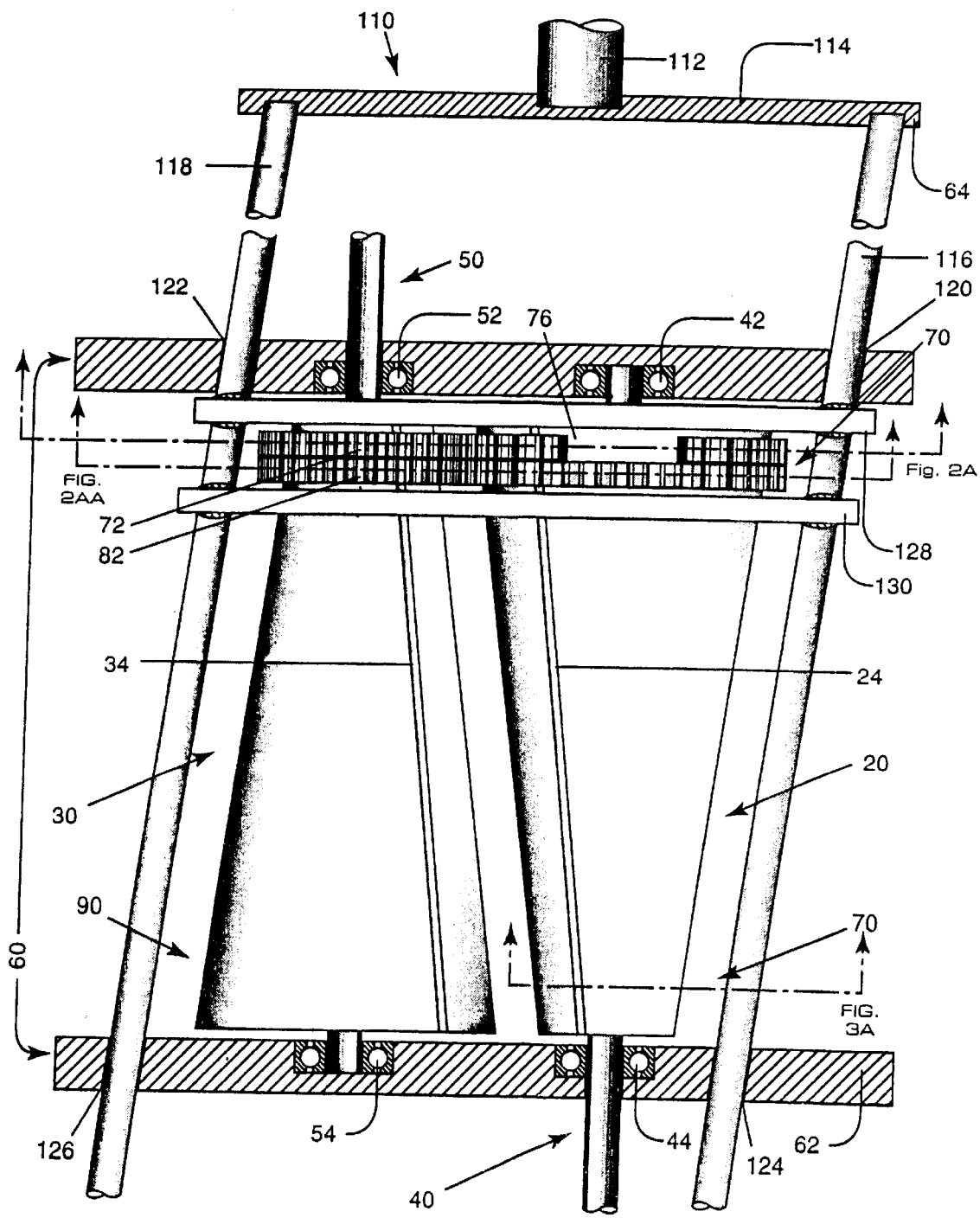
FIG. 1A is a plan view of the infinitely variable gear transmission system of the invention illustrating the gears in a high speed, low torque position.

FIG. 2AA is a sectional view looking in the direction of the arrows along the line 2AA—2AA in FIG. 1A.

Figure 1B:
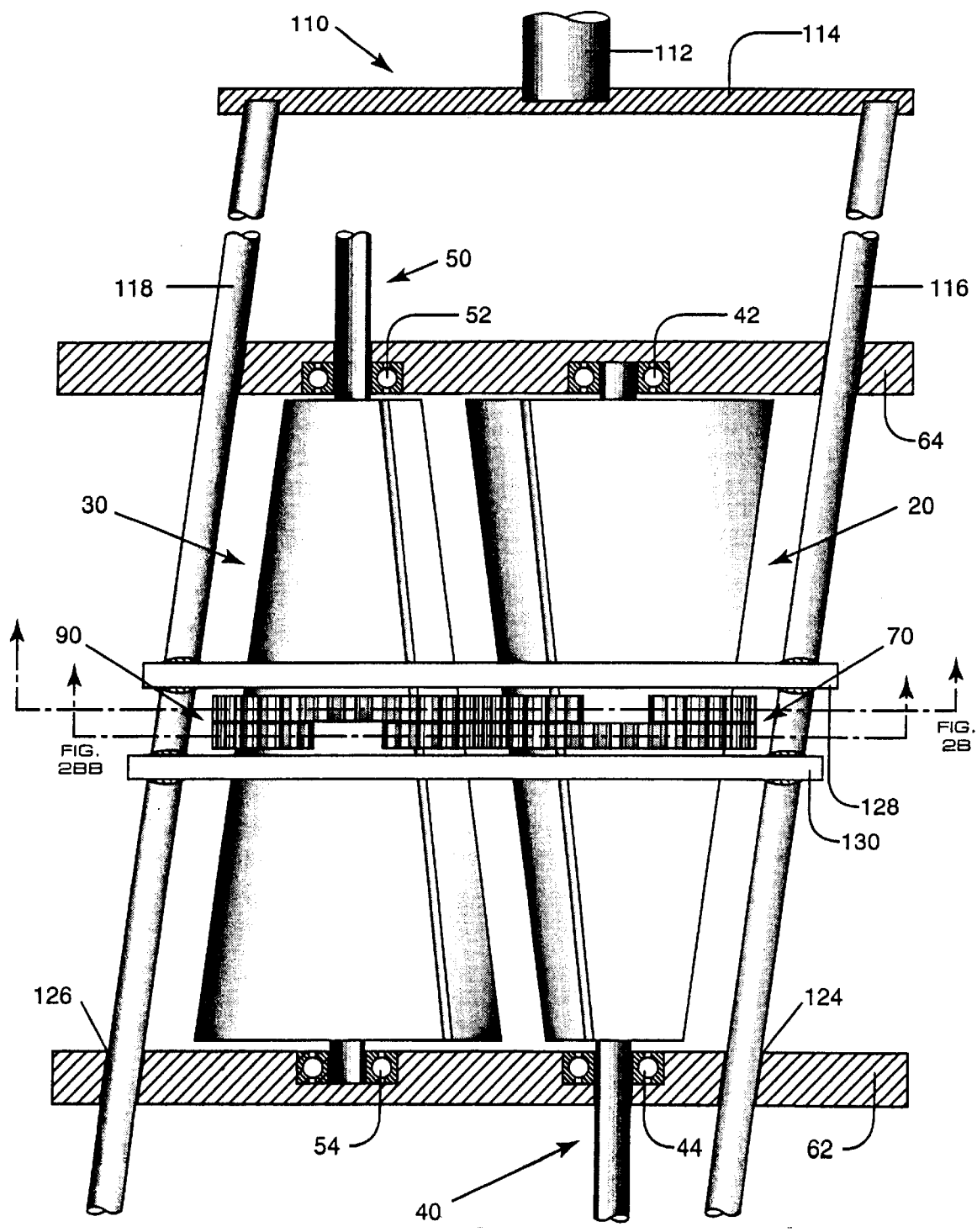
FIG. 1B is a plan view of the infinitely variable gear transmission system of the invention illustrating the gears in an intermediate position.
Figure 2B:
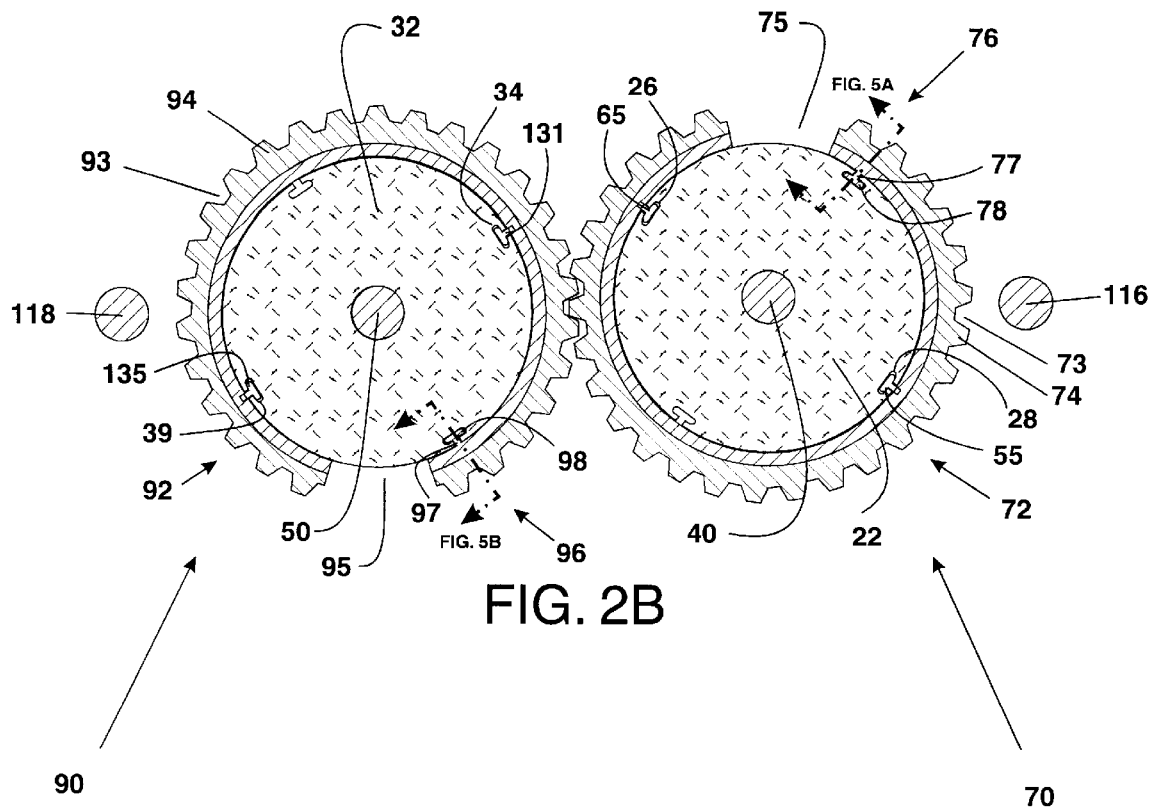
FIG. 2A is a sectional view looking in the direction of the arrows along the line 2A—2A in FIG. 1A.
Figure 2B:
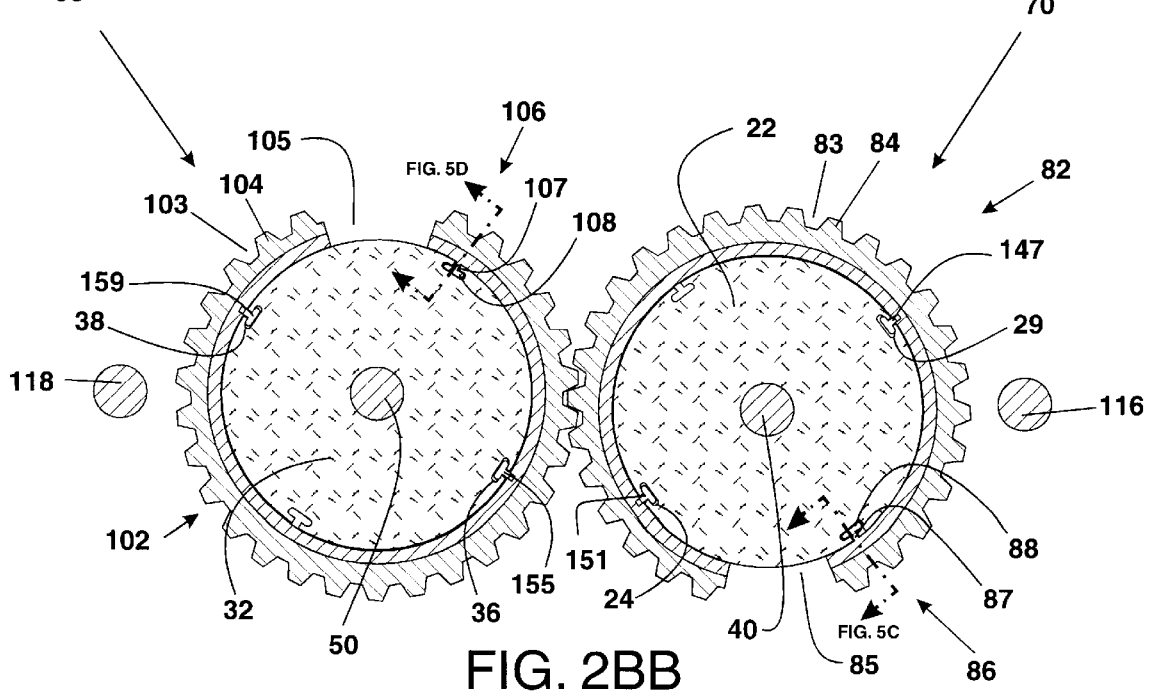

FIG. 2B is a sectional view looking in the direction of the arrows along line 2B—2B in FIG. 1B.

FIG. 2BB is a sectional view looking in the direction of the arrows along the line 2BB—2BB in FIG. 1B.

Figure 1C:
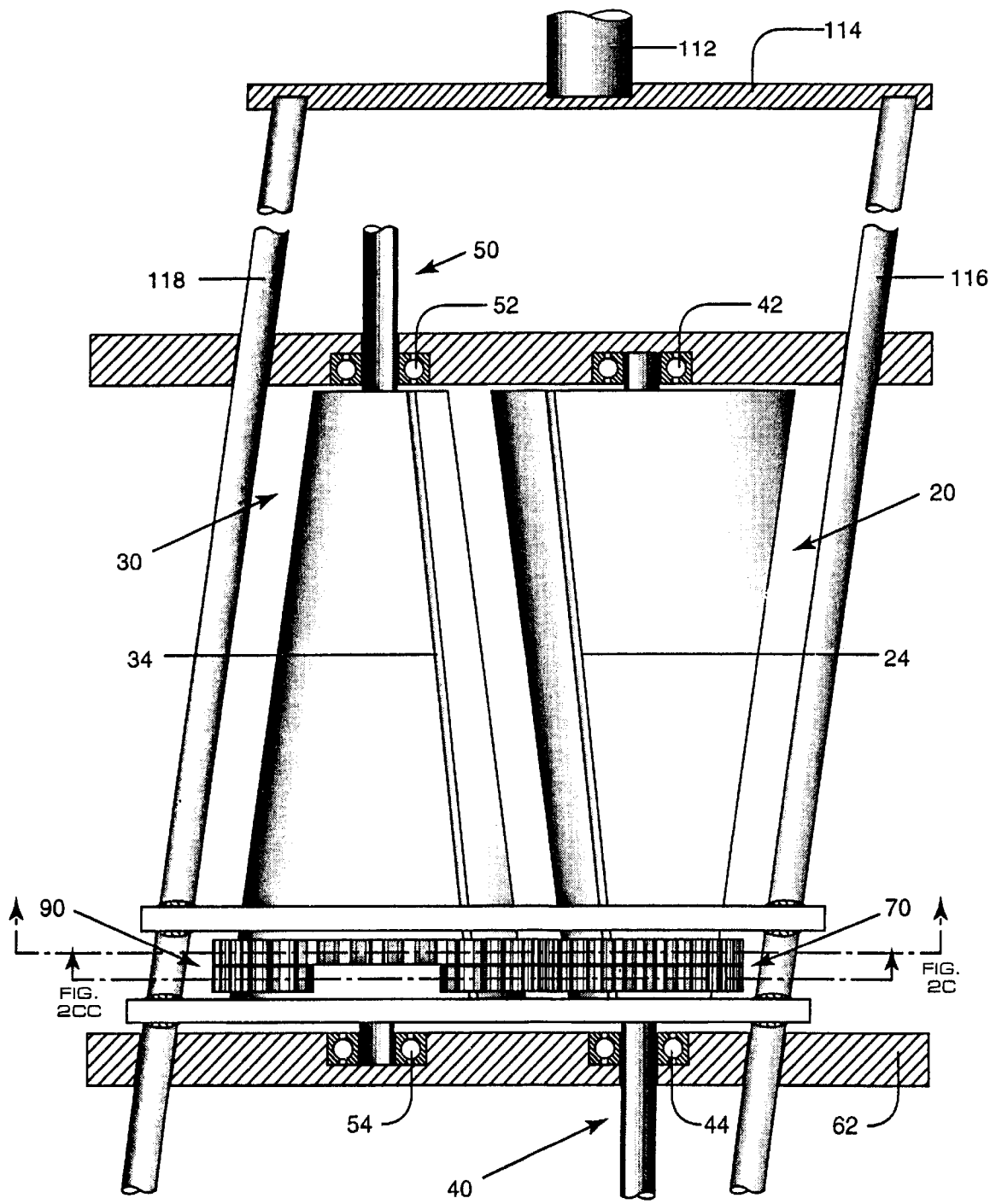
FIG. 1C is a plan view of the variable transmission system of the invention illustrating the gears in a low speed, high torque position.
Figure 2C:
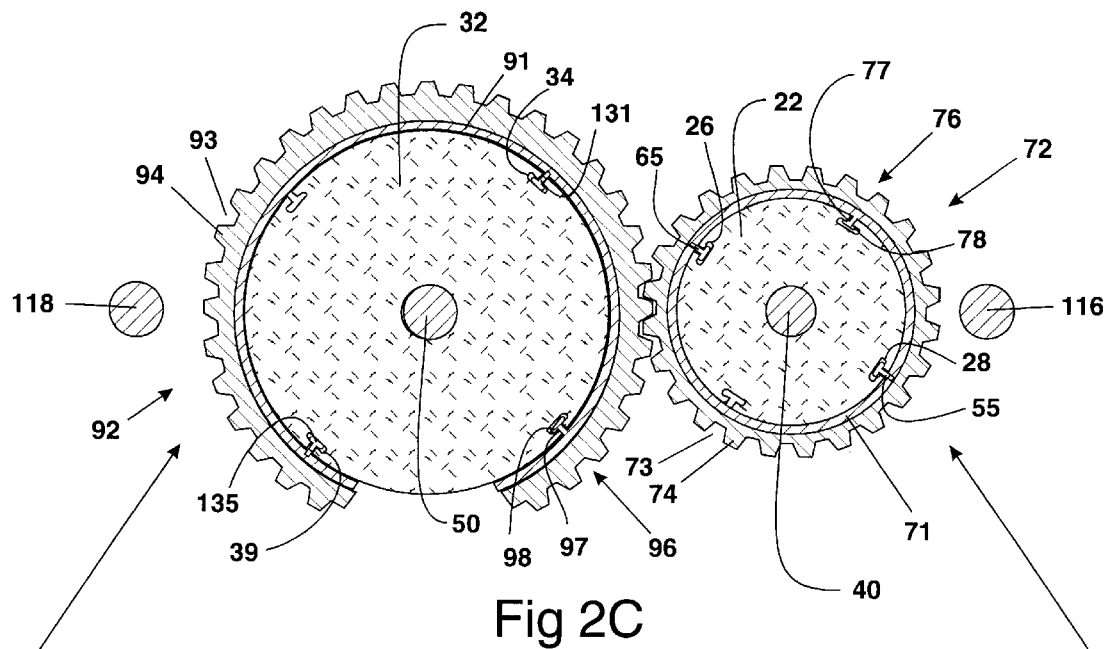
Figure 2C:
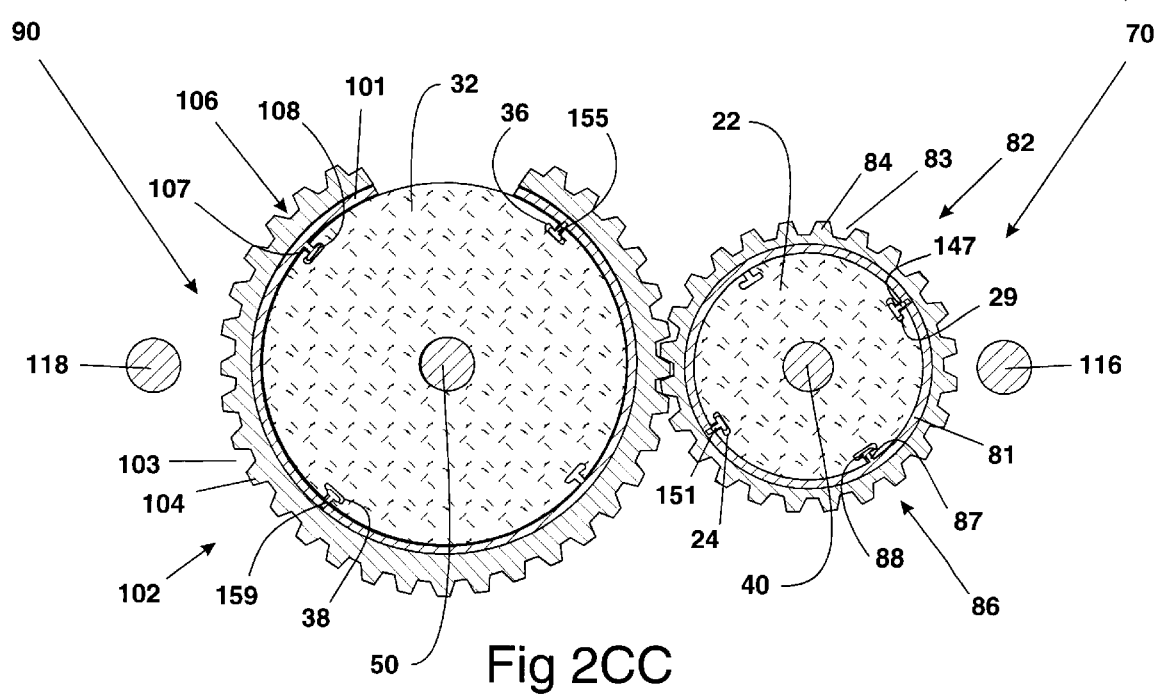

FIG. 2C is a sectional view looking in the direction of the arrows along the line 2C—2C in FIG. 1C.

FIG. 2CC is a sectional view looking in the direction of the arrows along the line 2CC—2CC in FIG. 1C.

Figure 3A:
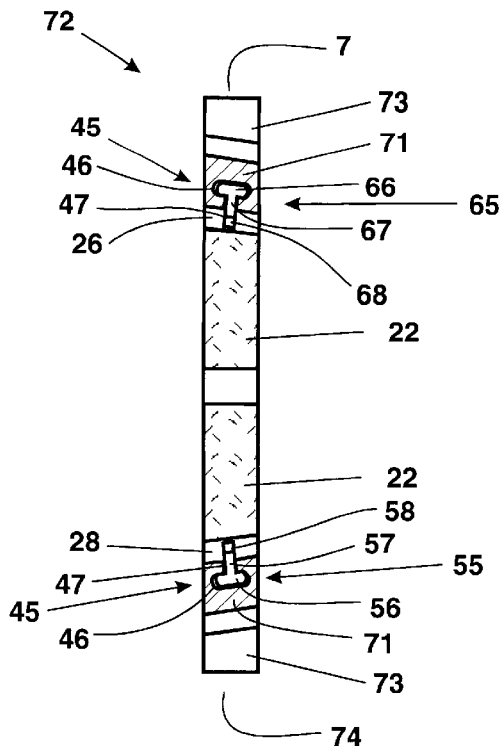

FIG. 3A is a sectional view looking in the direction of the arrows along the line 3A—3A in FIG. 2A.

Figure 3B:
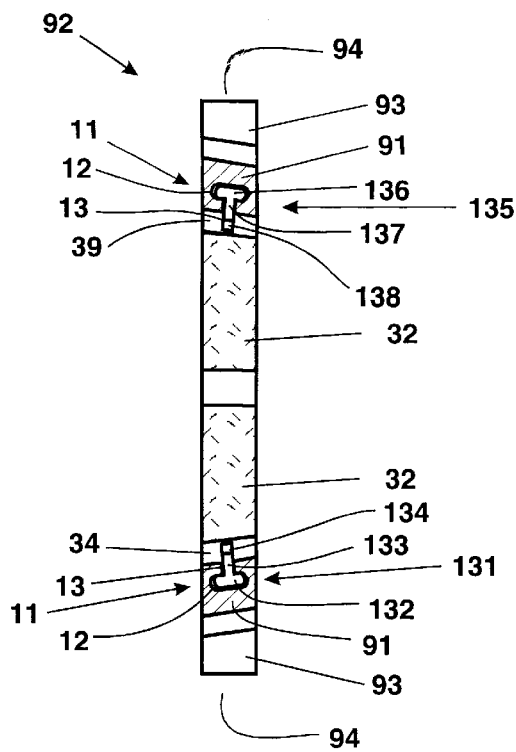

FIG. 3B is a sectional view looking in the direction of the arrows along the line 3B—3B in FIG. 2A.

Figure 3C:
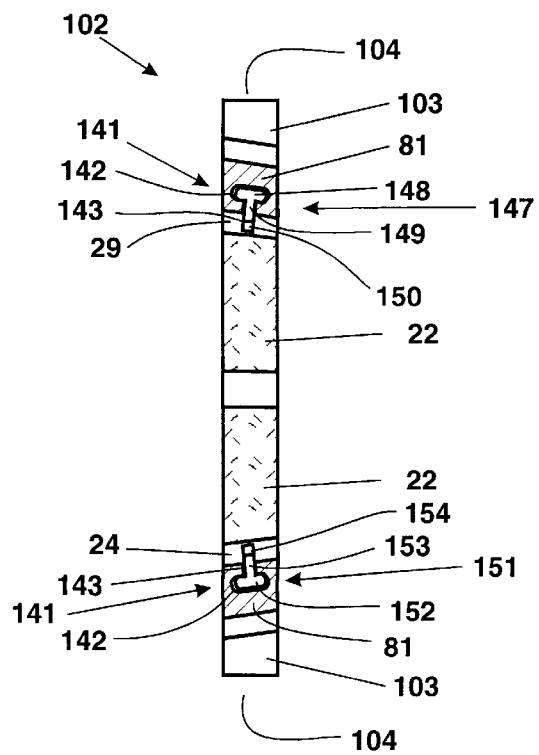

FIG. 3C is a sectional view looking in the direction of the arrows along the line 3C—3C in FIG. 2AA.

Figure 3D:
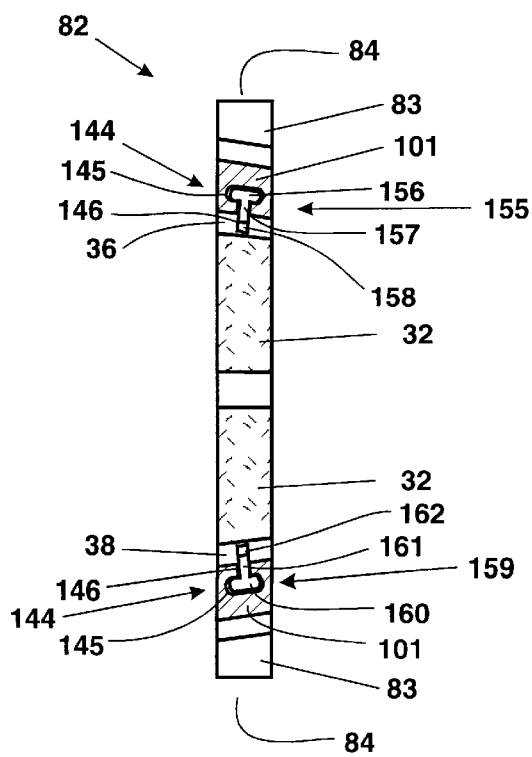

FIG. 3D is a sectional view looking in the direction of the arrows along the line 3D—3D in FIG. 2AA.

Figure 4:
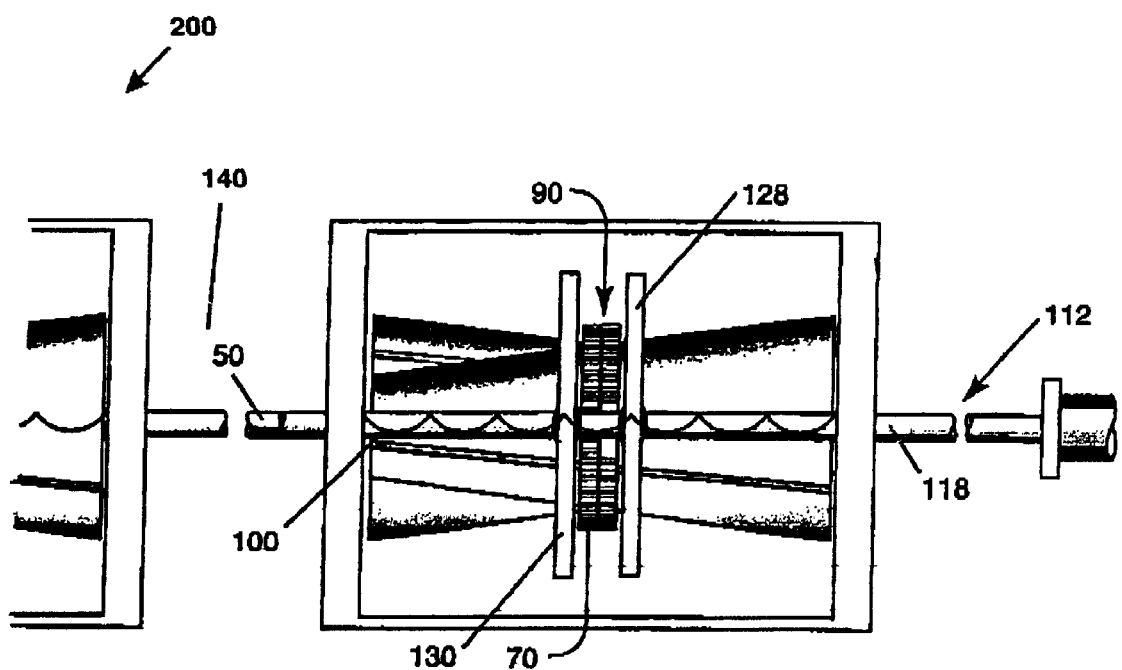

FIG. 4 is a schematic side view of the infinitely variable gear transmission system of the present invention illustrating a tandem infinitely variable gear transmission system.

Figure 4A:
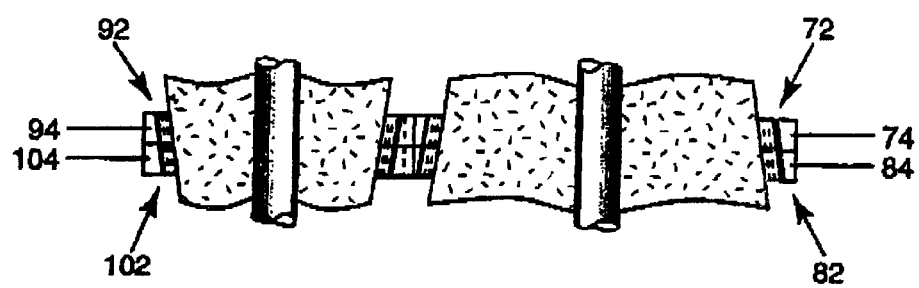

FIG. 4A is a sectional view looking in the direction of the arrows along the line 4A—4A in FIG. 2AA.

Figure 5A:
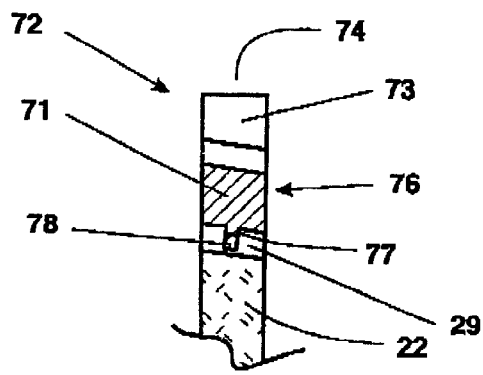

FIG. 5A is a sectional view looking in the direction of the arrows along the line 5A—5A in FIG. 2B.

Figure 5B:
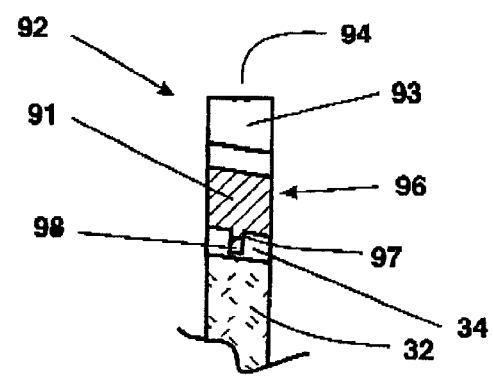

FIG. 5B is a sectional view looking in the direction of the arrows along the line 5B—5B in FIG. 2B.

Figure 5C:
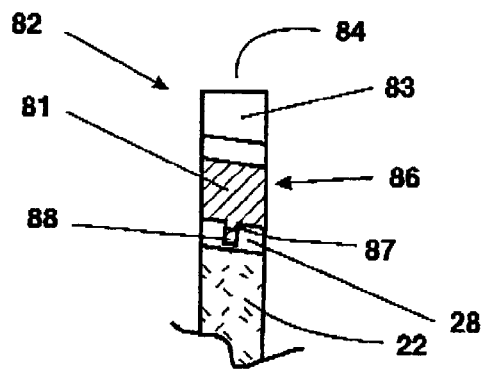

FIG. 5C is a sectional view looking in the direction of the arrows along the line 5C—5C in FIG. 2BB.

Figure 5D:
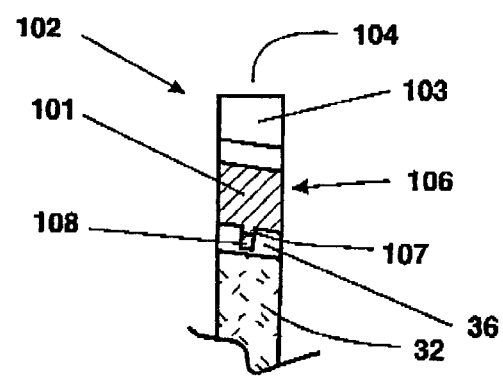

FIG. 5D is a sectional view looking in the direction of the arrows along the line 5D—5D in FIG. 2BB.

V DESCRIPTION OF THE PREFERRED EMBODIMENTS

The infinitely variable gear transmission system of present invention is indicated in drawings generally at 10. This system includes a driving cone 20 and driven cone 30, as illustrated in FIG. 1A. Cones 20 and 30 include respective body portions 22, 32 made of strong metal or plastic including but not limited to steel, heat treated aluminum alloy and/or reinforced plastic material.

Each of the cones has a large diameter at one end 21, 31 at one end and a smaller diameter at its respective other end 23, 33. The ratio of the large diameter end to the small diameter end is preferably from about 1.1/1 to about 5/1.

Cone body portion 22 is integrally connected to a drive shaft 40 by means of mechanical fasteners (not shown) or a shrink fit. The drive shaft passes through housing walls 62, 64 which are part of a housing 60, and through journal bearings 42 and 44.

As shown in FIG. 2A the cone body portion 22 includes slots 24 and 26 about 90 degrees apart and slots 28 and 29 about 90 degrees apart. These slots extend the full length of cone 20 and include a first shank portion 25 and an enlarged internal head portion 27. Cone body portion 32 also includes a pair of slots 34 and 36 about 90 degrees apart and a pair of slots 38 and 39 about 90 degrees apart, including shank portions 35 and internal head portions 37 as indicated in FIG. 3. The cone 30 is integrally connected to a driven shaft 50 by means of mechanical fasteners (not shown) or a shrink fit. The driven shaft passes through frame (not shown) and housing walls 62, 64 and through journal bearings 52, 54.

Cone 20 has a surrounding gear system 70. Surrounding gear system 70 includes a first gear segment 72, and a second gear segment 82 adjacent, but spaced from segment 72. Both segments are generally circular and which can expand and contract to a limited extent. The gear segments 72 and 82 include bushings 71, 81 gear teeth 74, 84; gear space 73, 83; and large expansion slots 75 and 85 which are spaced apart about 180 degrees as shown in FIGS. 2A and 2AA. The relative size of the teeth and slots is such that gear engagement will be maintained as the gears move longitudinally along cones 20 and 30, as the external diameters of the cones change during such longitudinal movement. See for example Toolmaker's Handbook; Miller & Russel Copyright 1981; Coles Publishing co. Toronto Canada pp 77–108 hereby incorporated into this application by this reference, including, but not limited to pp 77–108. The two segments each include dovetail projections 76 and 86 with shank portions 77, 87 and enlarged head portions 78, 88 which extend into slots 24 and 26 in cone body portion 22.

Cone 30 has a surrounding gear system 90. Surrounding gear system 90 includes a first gear segment 92, and a second gear segment 102 adjacent, but spaced from segment 92. Both segments are generally circular and which can expand and contract to a limited extent. The gear segments 92 and 102 include bushings 91, 101 gear teeth 94, 104 gear space 93, 103 and large expansion slots 95 and 105 which are spaced apart about 180 degrees as shown in FIGS. 2B and 2BB. The relative size of the teeth and slots is such that gear engagement will be maintained as the gears move longitudinally along cones 20 and 30, as the external diameters of the cones change during such longitudinal movement. See for example Toolmaker's Handbook; Miller & Russel, supra. The two segments each include dovetail projections 96 and 106 with shank portions 97, 107 and enlarged head portions 98, 108 which extend into slots 34 and 36 in cone body portion 32.

Gear segments 70 and 90 may be made of strong metal or plastic including but not limited to steel, heat treated aluminum alloy and/or reinforced plastic material. But the material should have sufficient ductility to allow the gear segments to expand and contract as they follow the contour of the cones 20 and 30. The gear teeth 74, 84, 94, 104 are preferably hardened for example by case hardening and/or induction hardening for increased wear. See Miller & Russel supra pp 340–356. Teflon or Teflon coated teeth, and slots and projections may also be used.

The thickness of the gear segments 72 is slightly less than the thickness of gear segments 92 and the thickness of gear segment 82 is slightly larger than gear segment 102 to adjust for the difference in cone diameter and maintain gear engagement. The difference in diameter depends on the diameters of the respective cones.

Furthermore, the gear systems 70 and 90 must be properly lubricated, for example by providing an oil bath 100 in the lower portion of the housing through which the segments pass during rotation to lubricate the engaging gear surfaces and the slots 24, 26, 28, 29, 34, 36, 38, 39 FIG. 3, as the dovetail projections follow the slots in moving longitudinally back and forth along the cones 20 and 30, as shown schematically in FIG. 4.

FIG. 3A shows slideable dovetails 65, 55 comprising enlarged heads 66, 56, shanks 67, 68, and enlarged heads 68, 58 aligned 90 degrees to enlarged heads 66 and 56, respectively. Slideable dovetail 65 moves longitudinally in slot 26 in cone portion 22. Slideable dovetail 55 moves longitudinally in slot 28 in cone portion 22. Bushing 71 is part of gear system 72 and contains slot 45 comprising enlarged head portion 46 and shank portion 47. Slideable dovetails 65, 55 move around slot 45 to keep gear 72 radially close to cone 20 as cone RPM increases, while allowing gear 72 to expand and contract freely as it moves longitudinally on cone 20.

FIG. 3B shows slideable dovetails 135, 131 comprising enlarged heads 136, 132, shanks 137, 133, and enlarged heads 138, 134 aligned 90 degrees to enlarged heads 136 and 132, respectively. Slideable dovetail 135 moves longitudinally in slot 39 in cone portion 32. Slideable dovetail 131 moves longitudinally in slot 34 in cone portion 32. Bushing 91 is part of gear system 92 and contains slot 11 comprising enlarged head portion 12 and shank portion 13. Slideable dovetails 135, 131 move around slot 11 to keep gear 92 radially close to cone 30 as cone RPM increases, while allowing gear 92 to expand and contract freely as it moves longitudinally on cone 30.

FIG. 3C shows slideable dovetails 147, 151 comprising enlarged heads 148, 152, shanks 149, 153, and enlarged heads 150, 154 aligned 90 degrees to enlarged heads 148 and 152, respectively. Slideable dovetail 147 moves longitudinally in slot 29 in cone portion 22. Slideable dovetail 151 moves longitudinally in slot 24 in cone portion 22. Bushing 81 is part of gear system 82 and contains slot 141 comprising enlarged head portion 142 and shank portion 143. Slideable dovetails 147, 151 move around slot 141 to keep gear 102 radially close to cone 20 as cone RPM increases, while allowing gear 102 to expand and contract freely as it moves longitudinally on cone 20.

FIG. 3D shows slideable dovetails 155, 159 comprising enlarged heads 156, 160, shanks 157, 161, and enlarged heads 158, 162 aligned 90 degrees to enlarged heads 156 and 160, respectively. Slideable dovetail 155 moves longitudinally in slot 36 in cone portion 32. Slideable dovetail 159 moves longitudinally in slot 38 in cone portion 32. Bushing 101 is part of gear system 102 and contains slot 144 comprising enlarged head portion 145 and shank portion 146. Slideable dovetails 155, 159 move around slot 144 to keep gear 82 radially close to cone 30 as cone RPM increases, while allowing gear 82 to expand and contract freely as it moves longitudinally on cone 30

FIG. 5A shows dovetail projection 76 in bushing 71, part of gear system 72. Dovetail projection 76 comprises shank 77 and enlarged head 78. Dovetail projection 76 moves longitudinally on cone 20 in slot 29.

FIG. 5B shows dovetail projection 96 in bushing 91, part of gear system 92. Dovetail projection 96 comprises shank 97 and enlarged head 98. Dovetail projection 96 moves longitudinally on cone 30 in slot 34.

FIG. 5C shows dovetail projection 86 in bushing 81, part of gear system 82. Dovetail projection 86 comprises shank 87 and enlarged head 88. Dovetail projection 86 moves longitudinally on cone 20 in slot 28.

FIG. 5D shows dovetail projection 106 in bushing 101, part of gear system 102. Dovetail projection 106 comprises shank 107 and enlarged head 108. Dovetail projection 106 moves longitudinally on cone 30 in slot 36.

Comparison of FIGS. 2A, 2AA reveals that the expansion gaps 75 and 85 are located 180 degrees apart so that at all times torque will be transmitted from the driving cone 20 to the driven cone 30 through the gear system 72 or 82. During most of the time gears 72 and 82 will both transfer torque respectively to gear system 92 and 102. However in the brief period when the respective gaps 75 and 85 reach gear teeth 94 and 104, torque will nonetheless be transferred through the operation of the other gear 72 or 82 engaging gear 92 or 102.

Comparing FIG. 2A, 2AA to FIG.2B, 2BB reveals that the size of gaps 75 and 85 have been reduced, and the gears 72 and 82 have reduced in diameter. Also in the gears 92 and 102 in FIGS. 2B, and 2BB significant gaps 95 and 105 are observable.

In FIGS. 2C and 2CC there is essentially no gap in gears 72 and 82, while a large gap 95, 105 appears in gears 92 and 102. However, nonetheless, in each situation torque is still transmitted during those relatively infrequent periods when the gap in one of the driven gears 95, 105 is adjacent the driving gears 72, 82 because the other driving gear will be engaging its respective driven gear 92, 102, keeping all gears in synchronization.

An acceleration and decceleration system is illustrated in FIGS. 1A through 1C at 110. This system includes an accelerator linkage 112, which may be manual or automatic, and which is integrally connected to an accelerator plate 114 by welding or with mechanical fasteners (not shown). This plate is connected by welding or mechanical fasteners (not shown) to a pair of longitudinally extending accelerator arms 116 and 118 which extend to and pass through openings 120 and 122 in the housing plate 64 and through openings 124 and 126 in housing plate 62.

A pair of transverse plates 128, 130 are integrally connected to accelerator arms 116 and 118 by welding or with mechanical fasteners (not shown). The transverse plates move the gear segments 70 and 90 longitudinally relative to the comes 20 and 30 to accelerate or decelerate the output shaft 50.

In operation, FIG. 1A shows the system in a high speed and a low torque mode of operation in which the drive shaft 40 and cone 20 at the large diameter end is rotated at a relatively high R.P.M. and is transmitting low torque through the gear system 70 to the gear system 90 and to output shaft 50. FIG. 1B shows the system at an intermediate rate of speed where the cone 20 driven by the drive shaft 40 is rotating at a lower R.P.M., but with more torque transferred from the gear segments 70 to the gear segments 90. FIG. 1C shows the system at a low rate of rotation of the cone 20 when the gear segment system 70 drives the cone 30 and its gears system 90 at relatively low rate of speed but with high torque transferred.

FIG. 3A shows slideable dovetails 65, 55 comprising enlarged heads 66, 56, shanks 67, 68, and enlarged heads 68, 58 aligned 90 degrees to enlarged heads 66 and 56, respectively. Slideable dovetail 65 moves longitudinally in slot 26 in cone portion 22. Slideable dovetail 55 moves longitudinally in slot 28 in cone portion 22. Bushing 71 is part of gear system 72 and contains slot 45 comprising enlarged head portion 46 and shank portion 47. Slideable dovetails 65, 55 move around slot 45 to keep gear 72 radially close to cone 20 as cone RPM increases, while allowing gear 72 to expand and contract freely as it moves longitudinally on cone 20.

FIG. 3B shows slideable dovetails 135, 131 comprising enlarged heads 136, 132, shanks 137, 133, and enlarged heads 138, 134 aligned 90 degrees to enlarged heads 136 and 132, respectively. Slideable dovetail 135 moves longitudinally in slot 39 in cone portion 32. Slideable dovetail 131 moves longitudinally in slot 34 in cone portion 32. Bushing 91 is part of gear system 92 and contains slot 11 comprising enlarged head portion 12 and shank portion 13. Slideable dovetails 135, 131 move around slot 11 to keep gear 92 radially close to cone 30 as cone RPM increases, while allowing gear 92 to expand and contract freely as it moves longitudinally on cone 30.

FIG. 3C shows slideable dovetails 147, 151 comprising enlarged heads 148, 152, shanks 149, 153, and enlarged heads 150, 154 aligned 90 degrees to enlarged heads 148 and 152, respectively. Slideable dovetail 147 moves longitudinally in slot 29 in cone portion 22. Slideable dovetail 151 moves longitudinally in slot 24 in cone portion 22. Bushing 81 is part of gear system 82 and contains slot 141 comprising enlarged head portion 142 and shank portion 143. Slideable dovetails 147, 151 move around slot 141 to keep gear 102 radially close to cone 20 as cone RPM increases, while allowing gear 102 to expand and contract freely as it moves longitudinally on cone 20.

FIG. 3D shows slideable dovetails 155, 159 comprising enlarged heads 156, 160, shanks 157, 161, and enlarged heads 158, 162 aligned 90 degrees to enlarged heads 156 and 160, respectively. Slideable dovetail 155 moves longitudinally in slot 36 in cone portion 32. Slideable dovetail 159 moves longitudinally in slot 38 in cone portion 32. Bushing 101 is part of gear system 102 and contains slot 144 comprising enlarged head portion 145 and shank portion 146. Slideable dovetails 155, 159 move around slot 144 to keep gear 82 radially close to cone 30 as cone RPM increases, while allowing gear 82 to expand and contract freely as it moves longitudinally on cone 30.

FIG. 5A shows dovetail projection 76 in bushing 71, part of gear system 72. Dovetail projection 76 comprises of shank 77 and enlarged head 78. Dovetail projection 76 moves longitudinally on cone 20 in slot 29.

FIG. 5B shows dovetail projection 96 in bushing 91, part of gear system 92. Dovetail projection 96 comprises shank 97 and enlarged head 98. Dovetail projection 96 moves longitudinally on cone 30 in slot 34.

FIG. 5C shows dovetail projection 86 in bushing 81, part of gear system 82. Dovetail projection 86 comprises of shank 87 and enlarged head 88. Dovetail projection 86 moves longitudinally on cone 20 in slot 28.

FIG. 5D shows dovetail projection 106 in bushing 101, part of gear system 102. Dovetail projection 106 comprises shank 107 and enlarged head 108. Dovetail projection 106 moves longitudinally on cone 30 in slot 36.

FIG. 4 shows a tandem mode of operation where the output from shaft 50 is the input drive shaft 140 in a second infinitely variable gear transmission unit 200 in order to further change the gear ratio in applications where a large change in gear ratio is required. It will be apparent to those skilled in the art that as many tandem units may be used as are necessary to obtain the gear ratio needed for the entire system.

VII What is claimed is:

1. An infinitely variable gear transmission system comprising:

first and second cones extending longitudinally and located adjacent one another;

each of said first and second cones having a large diameter end and a small diameter end;

the large diameter end of said first cone being located adjacent said small diameter end of said second cone; and said small diameter end of the first cone being located adjacent said large diameter end of said second cone;

means for connecting one of said first and second cones to a drive shaft;

means for connecting the other of said first and second cones to a driven shaft;

said first cone having located at its external perifery a first gear system comprising a first gear segment of generally circular shape including gear teeth and gear spaces;

said first gear segment having a first slot located in its external perifery; and a second gear segment longitudinally spaced from said first gear segment; said second gear segment being of generally circular shape and containing gear teeth and gear spaces;

said second gear segment having a second slot located in its external perifery; said first and a second slots located approximately 180 degrees apart;

said second cone having located at its external perifery a second gear system comprising a third gear segment of generally circular shape including gear teeth and gear spaces;

said third gear segment having a third slot located in its external perifery; and a fourth gear segment longitudinally spaced from said third gear segment; said fourth gear segment being generally and containing gear teeth and gear spaces;

said fourth gear segment having a fourth slot located in its external perifery;

said third and said fourth slots being located approximately 180 degrees apart;

means for moving said first gear system and said second gear system longitudinally relative to said first and second cones to vary the rate of rotation of said driven shaft with respect to said driving shaft;

said first, second, third, and fourth gear segments being made of a material of sufficient ductility to expand and contract as said first gear system and said second gear system longitudinally relative to said first and second cones.

2. An infinitely variable gear transmission system according to claim 1 wherein said means for moving said first gear system and said second gear system longitudinally relative to said first and second cones comprises first and second slots in each of said first and second cones and protections on said first, second third, and fourth gear segments which extend into and follow said respective slots in said first and second cones.

3. An infinitely variable gear transmission system according to claim 2 wherein said means for moving said first gear system and said second gear system longitudinally relative to said first and second cones comprises a linkage which engages at least one of said first, second, third and fourth gear segments.

4. An infinitely variable gear transmission system according to claim 3 wherein said means for moving said first gear system and said second gear system longitudinally relative to said first and second cones comprises cooperating projecting means on one of said gear segments and cones and slots in the other of said gear segments and cones.

5. An infinitely variable gear transmission system according to claim 4 wherein said means for moving said first gear system and said second gear system longitudinally relative to said first and second cones comprises projecting means on said gear segments and slots in said cones.

6. An infinitely variable gear transmission system according to claim 5 wherein said projecting means on said gear segments include dovetail projection means on said gears extending into cooperating shaped slots in said cones.

7. An infinitely variable gear transmission system according to claim 6 wherein said projecting means on said gear segments include dovetail projection means on said gears comprise a shank portion and an enlarged head extending outwardly therefrom in said slots.

8. An infinitely variable gear transmission system according to claim 7 wherein said dovetail projection means on said gears move longitudinally on said cones.

9. An infinitely variable gear transmission system according to claim 8 wherein said dovetail projection means on said gears move circumferentially on said cones.

10. An infinitely variable gear transmission system according to claim 5 wherein said first gear system and said second gear system include bushings.

11. An infinitely variable gear transmission system according to claim 10 wherein said bushings include bushing slots and wherein said means for moving said first gear system and said second gear system relative to said first and second cones comprises engaging means located in said bushing slots and said slots in said cones.

12. An infinitely variable gear transmission system according to claim 11 wherein said engaging means are dovetail shaped.

13. An infinitely variable gear transmission system according to claim 12 wherein said dovetails comprise a shank portion and an enlarged head portion.

14. An infinitely variable gear transmission system according to claim 13 wherein said enlarged head portion moves longitudinally in said cone slots.

15. An infinitely variable gear transmission system according to claim 11 wherein each of said gear segments include bushings having bushing slots and each of said cones include a plurality of cone slots and wherein a plurality of engaging means are located in said bushing slots and said cone slots.

16. An infinitely variable gear transmission system according to claim 15 wherein said transmission includes a transmission housing, and said first and second pair of cones are mounted within said transmission housing.

17. An infinitely variable gear transmission system according to claim 16 wherein said housing includes bearings and said drive shaft and said driven shaft extend into said bearings.

18. An infinitely variable gear transmission system according to claim 17 wherein said housing includes means for receiving said linkage.

19. An infinitely variable gear transmission system according to claim 18 wherein said linkage includes laterally spaced arms located on opposite sides of said cones.

20. An infinitely variable gear transmission system according to claim 19 wherein said linkage includes at least one transverse link attached to at least one of said lateraly spaced arms.

21. An infinitely variable gear transmission system according to claim 1 including means for lubricating said first and second gear systems.

22. An infinitely variable gear transmission system according to claim 21 wherein said first and second gear systems comprise bearing means and wherein said means for lubricating comprises means for placing lubricating fluid in contact with said first and second gear systems and said bearing means.

23. A method of transferring rotative power with an infinitely variable gear transmission system comprising:

proving first and second cones extending longitudinally and located adjacent one another;

forming on each of said first and second cones a large diameter end and a small diameter end;

locating the large diameter end of said first cone being located adjacent said small diameter end of said second cone; locating said small diameter end of the first cone being located adjacent said large diameter end of said second cone;

connecting one of said first and second cones to a drive shaft;

connecting the other of said first and second cones to a driven shaft;

locating on the external perifery of said first cone a first gear system comprising a first gear segment of generally circular shape including a first bushing and gear teeth and gear spaces;

forming a first slot on said first gear segment in its external perifery;

locating a second gear segment longitudinally spaced from said first gear segment; said second gear segment being of generally circular shape and containing a second bushing and gear teeth and gear spaces;

forming a second slot in said second gear segment in its external perifery;

locating said first and a second slots approximately 180 degrees apart;

locating at the external perifery of said second cone a second gear system comprising a third gear segment of generally circular shape including a third bushing and gear teeth and gear spaces;

locating in said third gear segment a third slot located in its external perifery;

locating a fourth gear segment longitudinally spaced from said third gear segment; said fourth gear segment being generally and containing a fourth bushing gear teeth and gear spaces;

forming in said fourth gear segment a fourth slot in its external perifery;

locating said third and said fourth slots approximately 180 degrees apart;

moving said first gear system and said second gear system longitudinally relative to said first and second cones to vary the rate of rotation of said driven shaft with respect to said driving shaft;

and forming said first, second, third, and fourth gear segments from a material of sufficient ductility to expand and contract as said first gear system and said second gear system longitudinally relative to said first and second cones.

24. A method according to claim 23 comprising forming first and second slots in each of said first and second cones and forming protections on said first, second, third, and fourth bushing and locating said projections within said respective slots in said first and second cones.

25. A method according to claim 24 including lubricating said first, second, third, and fourth gear segments.

26. An infinitely variable gear transmission system comprising:

a pair of cones, one the driving cone and the other the driven cone, in which each have at their external surfaces a pair of gears having bushings which interact to transmit power from a driving gear to the driven gear; and means for controlling the speed of the driving gear and the driven gear comprising an accelerator-decelerator linkage which causes said gears to move longitudinally back and forth relative to said rotating cones.

27. An infinatily variable gear transmission system according to claim 1 wherein the thickness of said first and fourth gear segments is less than the diameter of said second and third gear segments to adjust for difference in cone diameter and maintain gear engagement.

28. An infinitely variable gear transmission system according to claim 2 wherein the thickness of said first and fourth segments is less than the diameter of said second and third segments to adjust for difference in cone diameter and maintain gear engagement.

* * * * *